US009022741B2

(12) United States Patent
Houradou et al.

(10) Patent No.: US 9,022,741 B2
(45) Date of Patent: May 5, 2015

(54) SYSTEM FOR SECURING TWO TUBULAR COMPONENTS ONE IN THE OTHER, CARRYING A ROLLER BEARING

(75) Inventors: Emmanuel Houradou, Moissy-Cramayel Cedex (FR); Regis Eugene Henri Servant, Moissy-Cramayel Cedex (FR)

(73) Assignee: SNECMA, Paris (FR)

( * ) Notice: Subject to any disclaimer, the term of this patent is extended or adjusted under 35 U.S.C. 154(b) by 412 days.

(21) Appl. No.: 13/464,151

(22) Filed: May 4, 2012

(65) Prior Publication Data
US 2012/0288369 A1 Nov. 15, 2012

(30) Foreign Application Priority Data

May 9, 2011 (FR) ...................... 11 53978

(51) Int. Cl.
*F01D 25/16* (2006.01)
*F02C 7/36* (2006.01)
*F16C 35/073* (2006.01)

(52) U.S. Cl.
CPC ........... *F01D 25/162* (2013.01); *Y10T 403/587* (2015.01); *F02C 7/36* (2013.01); *F16C 35/073* (2013.01); *F05D 2230/64* (2013.01); *F05D 2260/30* (2013.01)

(58) Field of Classification Search
CPC .............. F01D 25/162; F05D 2230/64; F05D 2260/30; F16C 35/073; F02C 7/36; Y10T 403/587
USPC ........... 415/122.1, 170 R, 174, 229; 384/540, 384/906; 464/182
See application file for complete search history.

(56) References Cited

U.S. PATENT DOCUMENTS

| 3,900,270 | A | * | 8/1975 | Rhodes ......................... 403/317 |
| 4,201,426 | A | | 5/1980 | Garten et al. |
| 6,338,578 | B1 | | 1/2002 | Adde et al. |
| 2008/0317594 | A1 | * | 12/2008 | Servant ......................... 415/229 |
| 2009/0297083 | A1 | * | 12/2009 | Raberin et al. ................ 384/537 |

FOREIGN PATENT DOCUMENTS

| FR | 4 424 413 | 11/1979 |
| FR | 0 359 659 | 3/1990 |
| FR | 2 783 579 | 3/2000 |
| FR | 2 951 227 | 4/2011 |

OTHER PUBLICATIONS

French Preliminary Search Report issued Nov. 30, 2011, in French 1153978, filed May 9, 2011 (with English Translation of Categories of Cited Documents).

* cited by examiner

*Primary Examiner* — Liam McDowell
(74) *Attorney, Agent, or Firm* — Oblon, McClelland, Maier & Neustadt, L.L.P.

(57) ABSTRACT

A system for securing first and second tubular coaxial components carrying a roller bearing is provided. The system includes a forcing nut mounted inside the coaxial components and axially abutting against the first component after screwing-in of the second component; and a locking pin for preventing unscrewing of the nut and being arranged between the nut and the first component. The system also includes a cylindrical sleeve being arranged between the pin and the first component, being secured axially relative to the first component, and including an axial stop against which the pin is applied; and first and second devices for linking the pin and the first component in rotation, respectively, with the sleeve.

11 Claims, 3 Drawing Sheets

SYSTEM FOR SECURING TWO TUBULAR COMPONENTS ONE IN THE OTHER, CARRYING A ROLLER BEARING

SUMMARY OF THE INVENTION

The present invention relates to a system for securing, by means of a forcing nut and a pin for locking the nut, the end of a first tubular component to the inside of a second tubular component carrying a roller bearing to be flanged relative to said components after mounting and tightening of the system.

More particularly, although not exclusively, the invention relates to aeronautics and, notably, to gas-turbine engines (turbofans, turboprops, etc.).

In this specific application, the system is designed to secure the shaft (first component) of the high-pressure compressor of the engine to a reentrant-angle conical wheel on which is mounted the interior ring of the roller bearing of which the position is to be flanged axially, the shaft and the wheel being integral in rotation.

The invention will be described with regard to this application, in the knowledge that the securing system is not restricted thereto and may be used, generally speaking, on any device, mechanism, etc. that is designed to retain a roller bearing in a position and requires a locking pin to prevent unscrewing of the forcing nut through vibrations or the like generated, in the case of the above application, during operation of the turbine engine.

To recall, as shown schematically in FIG. 1 and the associated magnification L, a motor 1 of this type comprises, from upstream to downstream relative to the longitudinal axis A thereof, and in the direction of the gas flow F, a fan 2, a low-pressure compressor 3, a high-pressure compressor 4, a combustion chamber 5, a high-pressure turbine 6 receiving the gases from the combustion chamber, and a low-pressure turbine 7. The fan 2, the low-pressure compressor 3 and the low-pressure turbine 7 form a part of the rotor 8 of the engine 1 and are connected together by a line of rotating shafts 9 arranged in the axis A of the engine. In addition, the compressor 4 and the high-pressure turbine 6 form another part of the rotor 8, independent of the preceding part, and are connected together likewise by a line of rotating shafts 10 concentric with the line of shafts 9 arranged on the axis A, the lines of shafts 9 and 10 together providing an annular axial passage 11.

The stator 13 of the engine is provided around the rotor 8 and comprises a plurality of fixed casings, and all the cited components of the rotor and of the stator, except for the combustion chamber, carry alternating either movable 12A or fixed 12B blades located in the stream of the gas flow F defined between the rotor 8 and the stator 13.

The way in which a motor of this type operates is well-known and will not be described here.

One of the casings of the stator 13, designated generally as the intermediate casing 13A, and located downstream of the fan casing, is mounted, notably, on the relevant roller bearing 14 by the securing system 15 of the invention, namely the bearing commonly referenced bearing three since it is the third in the engine from upstream to downstream.

Bearings one and two (not shown) support the line of shafts 9 of the fan 2 and of the low-pressure compressor 3 and other bearings four and five (likewise not shown) are provided downstream at turbine level.

Bearing three 14 has its exterior ring 16 linked to the fixed intermediate casing 13A, while its interior ring 17 supports the end journal 19 of the rotating shaft 20 of the high-pressure compressor 4 by means of a cylindrical jacket 21 or wall of the rotating conical wheel 22. The latter meshes with another conical wheel 23 to form a perpendicular reentrant angle and thereby to drive in rotation the radial shaft 24 of the engine, symbolized by an axis line B, and designed to drive, by means of a gearbox, engine equipment and/or accessories such as pumps, current generators, etc.

In order to secure the shaft 20 (corresponding to the first component) to the inside of the conical wheel 22 (corresponding to the second component) carrying the bearing 14 and to thereby immobilize the interior ring thereof, the securing system 15 is engaged in the axial passage 11, between the lines of shafts, and includes, as suggested by document FR 2 783 579:

- a forcing nut 25 mounted inside the coaxial components and axially abutting against the first component after screwing-in of the second component; and
- a locking pin 26, for preventing unscrewing of the nut, arranged between the latter and the first component.

Thus, upon screwing-on of the nut 25, the conical wheel 22 and the shaft 20, which are integral in rotation, approach one another until they abut, which has the effect of axially immobilizing the interior ring of the bearing 14 relative to the conical wheel and to the shaft, with the aid of abutment rings (not illustrated).

In addition, the forcing nut 25, screwed on to the required torque, is immobilized in position by elastically deformable lateral fingers (or tabs) 27 of the pin, which are shown in larger form in the magnification L of FIG. 1 and engage in an internal receiving groove 28 of the end journal 19 of the shaft 20 of the compressor, which prevents the axial withdrawal of the pin 26 and hence that of the nut 25, and thus the unscrewing thereof.

Although this arrangement is satisfactory, the fingers 27, or at least some of those fingers, may appear to undergo significant bending during mounting/removal operations owing, notably, to the fact that the space of the axial passage 11 between the lines of shafts 9 and 10 is restricted. There is then a risk that they will permanently deform plastically and will no longer take an active part in axial locking of the pin and consequently of the nut. Given the operating conditions of the engine (vibrations, etc.), it is likely that the pin 26 will no longer perform its role perfectly, with the consequences this entails for the surrounding components in the event of rupture of the fingers or the emergence thereof from the shaft groove.

Furthermore, a pin 26 of this type with elastically deformable fingers 27 is complicated to produce and difficult to set in position and to remove.

Other securing systems 15 are also known, in which the forcing nut is self-extracting and to that end includes a supplementary nut and a locking stud for said supplementary nut. The supplementary nut is arranged around the forcing nut and interacts with the shaft journal by means of screwing-in on relatively small diameters owing to the restricted space of the passage between the forcing nut and the end of the journal.

In this solution of the system, the thread of the supplementary nut is, however, of small pitch to allow for high-pressure compressor pumping and, furthermore, as the same thread is likewise produced on the journal, in a small internal diameter, there is a significant risk of a component such as this being damaged.

The object of the present invention is to remedy the above drawbacks and it proposes a solution in which the design of the securing system is simplified and guarantees immobilization of the forcing nut once mounted without the risk of unscrewing, immobilization of the interior ring of the bearing and safe, reliable mounting/removal of the two associated tubular components (the compressor shaft and the conical wheel).

To that end, the system for securing the end of a first tubular component to the inside of a second tubular component carrying a roller bearing for holding the latter in position is of the type with a forcing nut and a pin for locking the nut, as defined previously.

According to the invention, the system is noteworthy in that it furthermore comprises a cylindrical sleeve arranged between the pin and the first component, being secured axially relative to the latter, and including an axial stop against which the pin is applied, and first and second means for linking the pin and the first component in rotation, respectively, with the sleeve.

Thus, by virtue of the invention, a simple intermediate sleeve between the pin and the first component, axially secured in position, makes it possible to fulfill the functions of linking in rotation between the pin and the first rotary component and axial abutment for the pin. In this way, as the pin is immobilized axially and linked in rotation to the first component via the cylindrical sleeve, axial withdrawal of the forcing nut and thus the unscrewing thereof are prevented, even under conditions of significant vibrations.

Production of the pin is thus simplified owing to the absence of elastically deformable fingers, and the ensuing operations of mounting and removal are likewise easier, quicker and safer.

In the preferred application, the sleeve corresponds to the rotary shaft of the high-pressure turbine, the corresponding end of which is extended to come between the end journal of the rotating shaft of the compressor and the locking pin and to axially immobilize the pin and hence the forcing nut. This sleeve originating from the turbine shaft thus plays a part in the securing system of the invention instead and in place of the elastically deformable fingers that are complex to produce and tedious to mount and to remove, and of the drawbacks of the other solution with supplementary nut and thread. The system of the invention consequently overcomes the aforesaid drawbacks.

For example, axial stop is defined simply by an internal shoulder provided in the lateral wall of the sleeve and against which the corresponding transverse face of the pin is applied.

In preferred embodiments, the first means for linking in rotation includes parallel flutes, regularly distributed over the exterior periphery of the pin and interior periphery of the cylindrical sleeve, and interacting with one another upon axially abutting relative engagement of the pin in the sleeve. In addition, the second means for linking in rotation includes at least one stud housed radially in the wall of the first tubular component and being engaged in an opening provided in the wall of the sleeve.

Furthermore, said locking pin is linked in rotation with the forcing nut when in axial abutment against the sleeve. Preferably, the link in rotation of the pin to the nut is defined by lateral claws provided in the opposing transverse faces of the nut and of the pin and being assembled one in the other.

Advantageously, the pin is in the form of a cylindrical ring. The simplicity of production of the pin will be noted, which, combined with that of the cylindrical sleeve, define a securing system offering a high level of reliability during use.

In particular, the forcing nut includes, in addition to its thread for the link to the second component, an external annular edge suitable for abutting against an internal shoulder of the first component, and an external collar between the thread and the edge suitable for interacting with a corresponding bore provided in the first component for centering purposes.

In the preferred application of the securing system, the first tubular component is the journal of the shaft of the high-pressure compressor of a gas-turbine engine; the second tubular component is the conical wheel, supported by the bearing, for driving the transmission shaft of the accessory gearbox; and the sleeve is the shaft of the high-pressure turbine of the engine.

The present invention also relates to the gas turbine engine that comprises a system for securing the shaft of the high-pressure compressor to the conical wheel driving the transmission shaft of the accessory gearbox for flanging the roller bearing supporting the wheel. The securing system is as defined above.

BRIEF DESCRIPTION OF THE DRAWINGS

The figures of the appended drawing will make it possible satisfactorily to understand how the invention may be implemented. In these figures, identical reference numbers denote similar elements.

DESCRIPTION OF THE PREFERRED EMBODIMENTS

Figure 1:
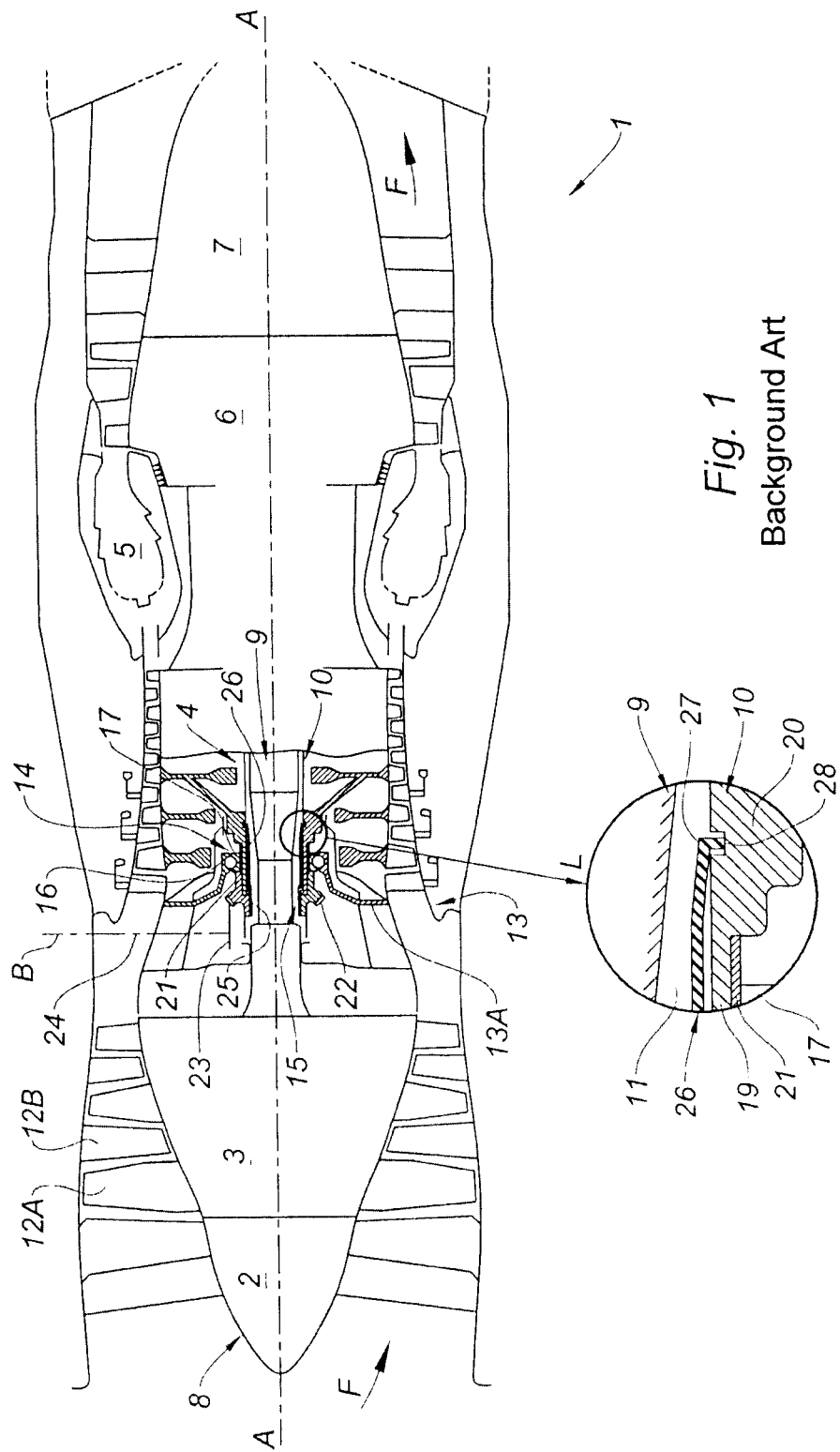
FIG. 1 shows schematically, in axial section, an aircraft gas turbine engine with a securing system of the prior art for flanging the roller bearing located at the high-pressure compressor of the engine.
Figure 2:
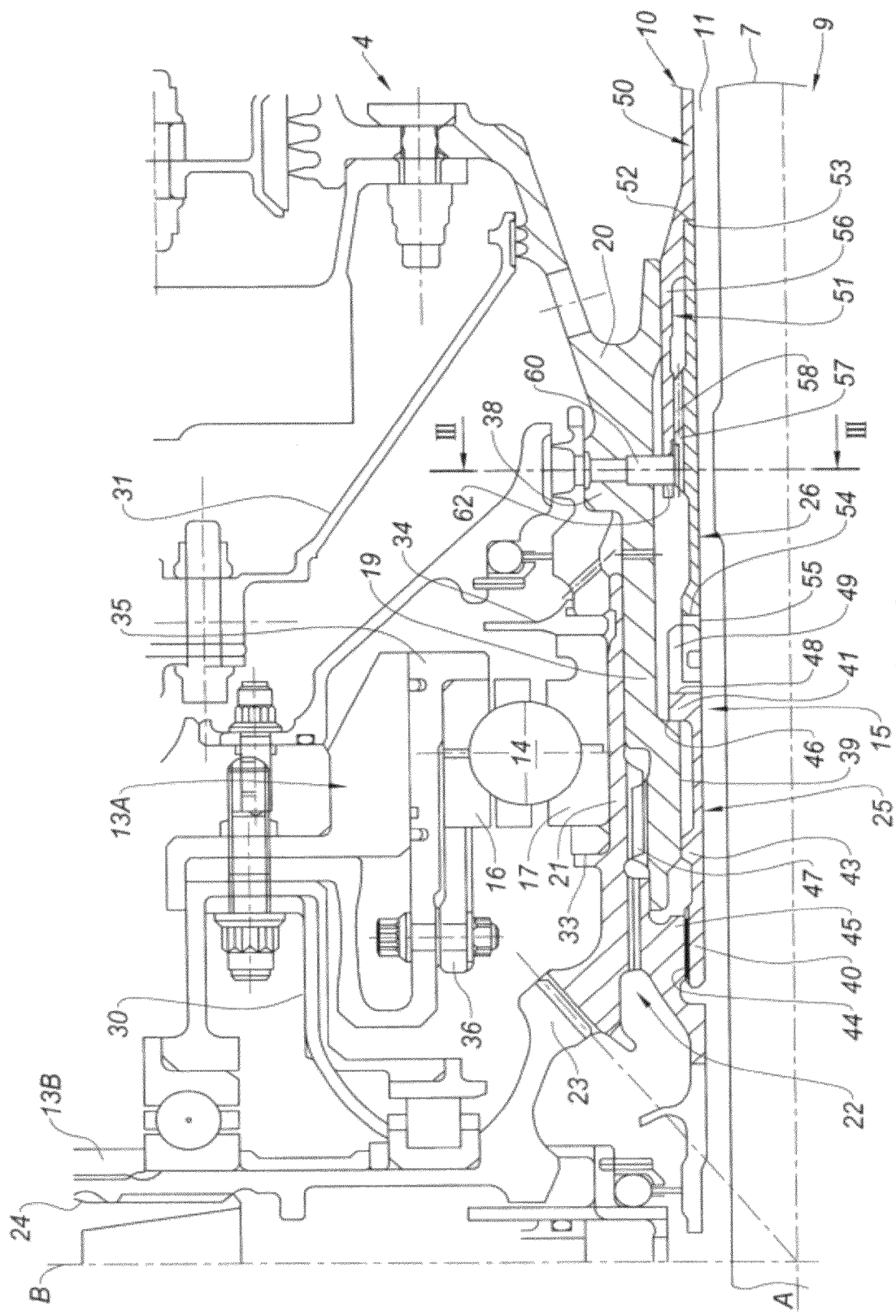
FIG. 2 is an enlarged view in partial axial section of the securing system according to the invention, for flanging said bearing.

As shown in greater detail in FIG. 2, the bearing 14 of ball-bearing type is mounted between the hub of the fixed intermediate casing 13A of the engine stator and the line of rotating shafts 10 composed, at this point of the rotor 8 of said engine, by the tubular wall 21 originating from the rotating conical wheel 22 and the end journal 19 of the rotating tubular shaft 20 of the high-pressure compressor 4. The journal 19 of the shaft and the wall 21 of the toothed wheel of the line of rotating shafts 10 delimit the axial passage 11 with the line of rotating shafts 9 of compressor and low-pressure turbine 3 and 7 and are associated with one another along the axis A by the securing system 15 of the invention mounted in the passage 11, the aim of which is likewise to axially lock the interior ring 17 of the bearing.

It may be seen in said FIG. 2 that the bearing 14 is contained in an enclosure delimited by an upstream sealing flange 30 and a downstream sealing flange 31. The upstream flange 30 securely connects the intermediate casing 13A to a casing 13B of the radial shaft 24, and the downstream flange 31 securely connects the intermediate casing 13A to the shaft 20 of the high-pressure compressor 4. In particular, the interior ring 17 of the bearing 14 is mounted about the cylindrical wall 21 of the toothed wheel 22 and is immobilized axially between an external radial shoulder 33 provided on the cylindrical wall and a retention ring 34 that is in axial contact with an external radial shoulder 38 of the shaft 20 of the compressor and which lies about the end of the cylindrical wall 21 of the wheel in order, in turn, to be in contact with the interior ring 17.

The securing system 15 of the invention locks the rotating interior ring 17 of the bearing 14 in position. Before giving a description thereof, the exterior ring 16 of the bearing is itself immobilized axially between an annular edge 35 ending a component of the fixed intermediate casing 13A and a component 36 attached securely thereto.

The securing system 15 to be mounted in the axial passage 11 of the line of shafts comprises the forcing nut 25 and the locking pin 26 of the latter, which is made indispensible by reason of the vibrations generated by operation of the engine 1.

For example, the forcing nut 25 in the form of a cylindrical ring comprises, first, a part with an external thread 40 and, second, an external annular edge 41. In addition, between the thread and the edge there is a projecting collar or crown 43. The thread is screwed onto a corresponding internal screwthread 44 provided in the bore 45 of the toothed wheel, while the external annular edge 41 is designed to come into contact with an internal shoulder 46 provided in the end journal 19 of the shaft during screwing-on of the nut. The journal engages coaxially in the cylindrical wall 21 of the toothed wheel.

Prior to mounting of the nut 25, the shaft 20 and the toothed wheel 22 are linked in rotation one to the other, preferably by flutes 47 provided at the external periphery of the end journal 19 and at the internal periphery of the cylindrical wall 21 of the wheel.

It will thus be understood that screwing-on of the forcing nut 25 via its thread 40 in the internal screwthread 44 of the toothed wheel causes the wheel and the compressor shaft to move closer together axially until the external edge 41 of the nut abuts against the internal shoulder 46 of the journal. The stop ring 34, pushed by the shoulder 38 of the shaft 20, is thus applied on the interior ring 17 of the bearing 14, and the ring 17, on the other side, abuts against the external shoulder 33 of the wheel 22. The ring 17 is held in position axially.

The collar 43 of the nut guarantees guiding and centering of the nut 25 in the bore 39 of the journal 19, defining a bearing surface relative thereto.

The transverse face 48 of the forcing nut, on the external edge 41 side, is crenellated and ends in lateral claws 49 with which a tool can interact in order to screw/unscrew the nut and also the pin, as will be seen below.

As regards the locking pin 26 of the forcing nut 25, this is in the form of a cylindrical ring and is arranged in the axial passage 11 of the line of shafts, substantially in the extension of the ring-form nut. This locking pin 26 must thus be immobilized axially in position and in rotation with the shaft 20 of the compressor and interact with the forcing nut 25 in order to prevent any likelihood of unscrewing (helical displacement) of the nut and to guarantee a failure-proof link between the toothed wheel 22 and the shaft 20 of the compressor, and optimum flanging of the interior ring 17 of the ball bearing of the bearing 14.

To that end, the securing system 15 furthermore comprises an intermediate sleeve 51 that corresponds, in the aforesaid application, to the cylindrical sleeve of annular transverse section of the shaft 50 of the high-pressure turbine 6 of the engine, which shaft is located in the axial passage 11.

This cylindrical sleeve 51 therefore forms an integral part of the turbine shaft 50 of the line 10 in question of the rotor 8 and, in this case, it is suitable for engaging between the cylindrical pin 26 and the shaft 20 of the compressor by acting as linking interface between them.

In order axially to lock the pin 26 in position and thus prevent withdrawal along the axis A of the forcing nut 25, the sleeve 51 has an axial stop formed, in this example, by an internal shoulder 52 provided in the lateral wall 56 of the sleeve and against which the corresponding transverse face 53 of the pin is applied. Quite obviously, once the turbine shaft is in position, the turbine is immobilized axially in position and is thus fixed along the axis A of the engine. The sleeve 51 of the rotating shaft is consequently fixed axially, with the face 53 of the pin 26 in axial abutment against the shoulder 52.

The opposite transverse face 54 of the locking pin has lateral claws 55 interacting with those 49 of the forcing nut 25 in such a manner as to link pin and nut in rotation.

Figure 3:
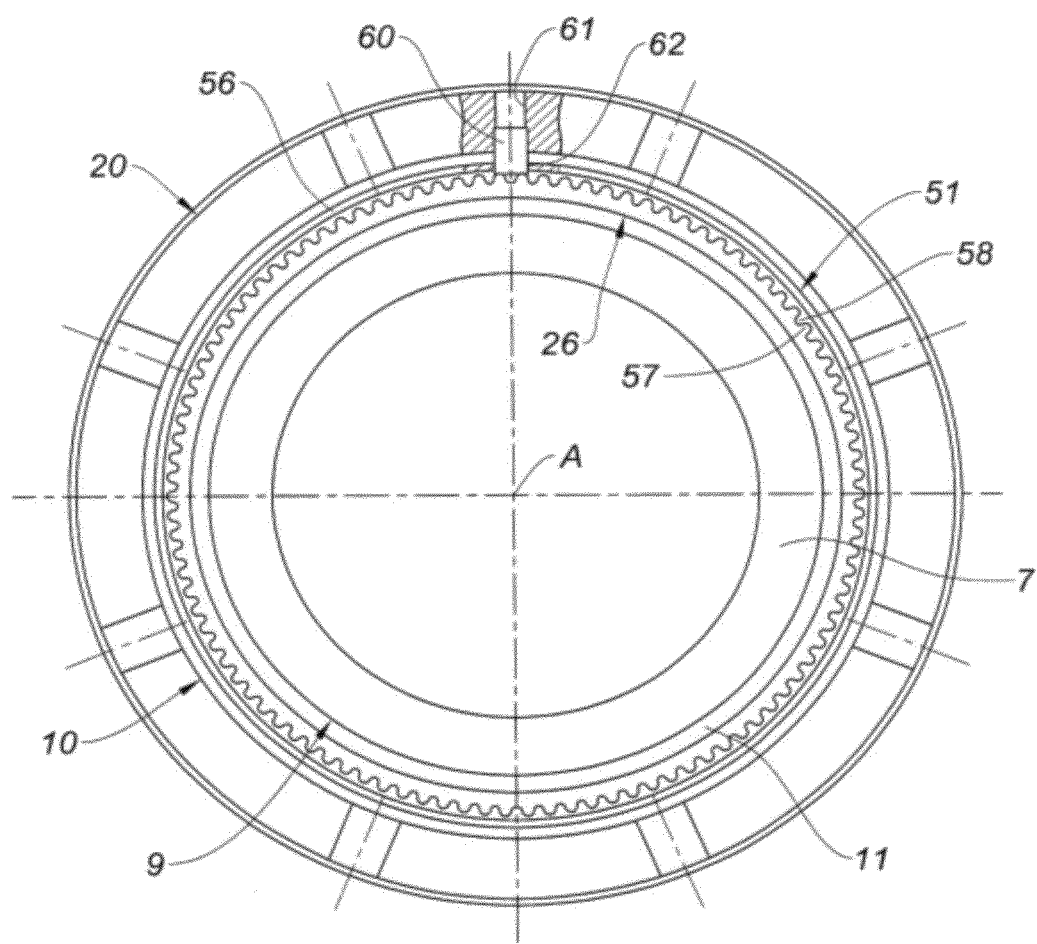
FIG. 3 is a transverse section along axis III-III of FIG. 2, passing through the first and second means for linking in rotation the sleeve to the pin and to the high-pressure compressor shaft.

In addition, to ensure a global link in rotation between, on the one hand, the intermediate sleeve 51 of the turbine rotating shaft and the locking pin 26 and, on the other, between the rotating shaft 20 of the compressor and the sleeve 51, the securing system 15 includes specific means shown in FIG. 2 and FIG. 3.

A first means for linking in rotation is in the form of parallel flutes 57 and 58 that secure in rotation the cylindrical pin to the sleeve. The flutes 57 are regularly distributed at the exterior periphery of the cylindrical pin 26 and are suitable for engaging with corresponding flutes 58 provided regularly at the internal periphery of the wall 56 of the cylindrical sleeve 51.

It should be pointed out that, if, during mounting of the pin, the flutes 57, 58 and the claws 49, 55 are slightly offset angularly with respect to one another, preventing axial assembly of the components, a tightening excess torque is exerted on the nut to align the claws with the flutes.

A second means for linking in rotation is in the form of a radial stud 60 associating the shaft 20 of the compressor with the sleeve 51 of the turbine shaft. In particular, the stud 60 is housed radially in a hole 61 provided in the wall of the end journal 19 of the shaft 20 and engages in an opening 62 made so as to correspond in the cylindrical lateral wall 56 of the sleeve. This opening is, for example, in the form of a circular hole such that the stud accommodated in this hole provides, in addition to linking the shaft 20 and the sleeve 51 in rotation, axial immobilization of these latter in position, being in abutment against the pin as a result of the mounting of the sleeve 51 of the turbine shaft between the pin 26 and the shaft 20 of the compressor.

It will therefore be understood that, via the sleeve and the means for linking in rotation and for axial abutment, a robust, compact system between the pin 26, the sleeve 51 and the shaft 20 is obtained, which prevents any unscrewing of the nut 25. Furthermore, no part of the aforementioned components is deformed when mounting and removing said components, thus guaranteeing significant reliability during use.

The forcing nut 25 of the system 15 clamps the toothed wheel 22 with the journal 19 of the compressor in order to hold the interior ring 17 of the bearing 14, and the locking pin 26 immobilizes the nut 25 and prevents any inopportune unscrewing, even at high levels of vibration, and does so without elastically deformable fingers. The flutes, the design of which is simple and reliable, and the stud guarantee there is no rotation between the sleeve, the pin and the shaft of the compressor, ensuring links in rotation, and the sleeve of the system thus designed also ensuring axial abutment of said pin. The securing system thus achieves its objectives by means of the simplification of its component parts by virtue of the advantageous use of the sleeve of the turbine shaft, which consequently reduces manufacturing and maintenance costs and allows pooling of functions.

Furthermore, to recap, the conical wheel 22 comprises teeth that interact with those of a conical pinion 23 arranged perpendicularly to the axis A of the engine 1 and integral with the radial shaft 24 partially shown in FIG. 2. The original cones of the wheel 22 and of the pinion 24 converge toward the intersection of the geometric axes A of the engine and B of the radial shaft. The latter extends as far as the fan casing, where it is connected to a gearbox for driving the auxiliary engine equipment.

The invention claimed is:

1. A system for securing an end of a first tubular component to an inside of a coaxial second tubular component carrying a roller bearing in order to hold the roller bearing in position, said system comprising:
   a forcing nut mounted inside the first and second coaxial tubular components, a first end of the forcing nut including external threads which are screwed onto internal threads of the second component and a second end of the forcing nut including an external edge which axially abuts against an internal shoulder of the first component when the forcing nut is screwed onto the second component;
   a locking pin for preventing unscrewing of the forcing nut, the locking pin being arranged between the forcing nut and the first component; and
   a cylindrical sleeve arranged between the locking pin and the first component, the sleeve being secured axially relative to the first component, and including an axial stop against which the locking pin is applied,
   wherein first rotational linkage means are arranged between the locking pin and the cylindrical sleeve, and
   wherein second rotational linkage means are arranged between the first component and the cylindrical sleeve.

2. The system as claimed in claim 1, wherein the axial stop is defined by an internal shoulder provided in a lateral wall of the cylindrical sleeve and against which a corresponding transverse face at a first end of the pin is applied.

3. The system as claimed in claim 1, wherein the first rotational linkage means includes a first set and a second set of flutes which engage together, the first set of flutes being provided at an interior periphery of the cylindrical sleeve, and the second sets of flutes being provided at an exterior periphery of the locking pin, the second set of flutes being disposed upstream of a first end of the locking pin.

4. The system as claimed in claim 1, wherein the second rotational linkage means includes at least one stud housed radially in a wall of the first tubular component and engaged in an opening provided in a wall of the sleeve.

5. The system as claimed in claim 1, wherein said locking pin is linked in rotation with the forcing nut when in axial abutment against the sleeve.

6. The system as claimed in claim 5, wherein the link in rotation of the pin to the nut is defined by lateral claws provided in a transverse face at a second end of the forcing nut and a transverse face at a second end of the pin and the claws of the forcing nut and the claws of the locking pin are assembled one in the other.

7. The system as claimed in claim 1, wherein the pin is in the form of a cylindrical ring.

8. The system as claimed in claim 1, wherein the forcing nut includes an external collar disposed between the first end and the second end thereof and suitable for interacting with a corresponding bore provided in the first component.

9. The system as claimed in claim 1, wherein the first tubular component is a journal of a shaft of a high-pressure compressor of a gas-turbine engine; the second tubular component is a conical wheel, supported by the bearing, for driving a radial transmission shaft of an accessory gearbox; and the sleeve is a shaft of a high-pressure turbine of the gas-turbine engine.

10. A gas-turbine engine, comprising a system for securing the shaft of the high-pressure compressor to the conical wheel driving the radial transmission shaft of the accessory gearbox, for flanging the roller bearing supporting the conical wheel, as claimed in claim 9.

11. The system as claimed in claim 1, wherein the internal shoulder of the sleeve is disposed downstream of the opening in which the stud is engaged and downstream of the first and second rotational linkage means.

\* \* \* \* \*